Figure 1:
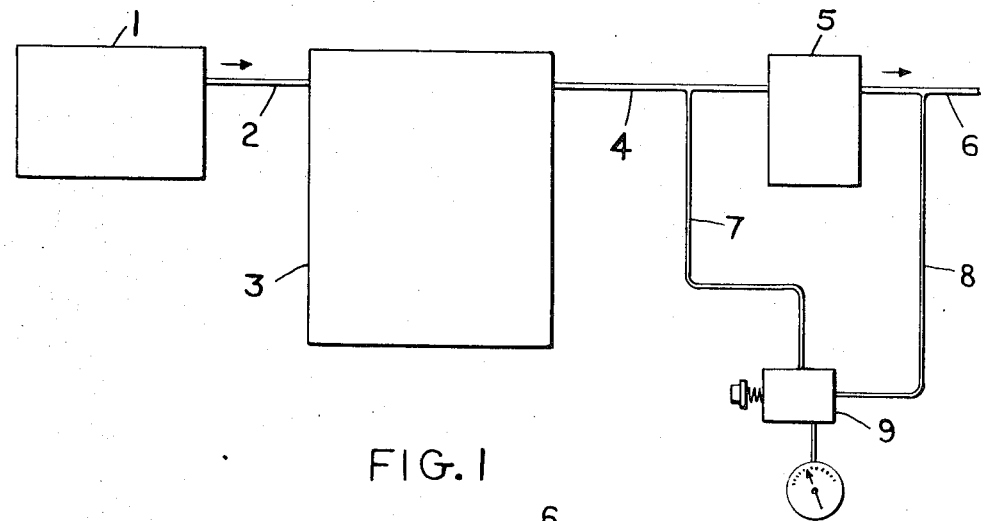

United States Patent

[11] 3,547,149

| | | |
|---|---|---|
| [72] | Inventor | Carl Bloom<br>Springfield, Mass. |
| [21] | Appl. No. | 751,627 |
| [22] | Filed | April 3, 1968<br>Division of Ser. No. 491,223, Sept. 29,<br>1965, Patent No. 3,413,855. |
| [45] | Patented | Dec. 15, 1970 |
| [73] | Assignee | Worthington Corporation<br>Harrison, N.J.<br>a corporation of Delaware, by mesne<br>assignments |

[54] APPARATUS FOR MEASURING AND INDICATING FLUID PRESSURE ACROSS A FLUID RESTRICTION
1 Claim, 2 Drawing Figs.

[52] U.S. Cl. .................................................... 137/560,
137/565
[51] Int. Cl. ....................................................... G01l 13/00
[50] Field of Search........................................... 137/560,
565, 557, 625.4; 73/389, 396, 420, 38;
116/(Inquired), 70

[56]        References Cited
        UNITED STATES PATENTS

| 1,018,582 | 2/1912 | Nelson .......................... | 73/396 |
| 1,662,529 | 3/1928 | McKinley ...................... | 73/38 |
| 2,456,574 | 12/1948 | Yeomans....................... | 137/565X |
| 2,737,804 | 3/1956 | Helzog et al. ................. | 73/38 |
| 2,985,020 | 5/1961 | Fisher........................... | 73/38X |

*Primary Examiner*—William R. Cline
*Attorney*—Daniel H. Bobis

ABSTRACT: A device for selectively measuring on a single gauge the pressure upstream and downstream of an oil separating device disposed in a compressor discharge line to enable comparisons of the pressures on opposite sides of the oil separating device and to provide accurate means for determining the pressure drop across the oil separating device.

PATENTED DEC 15 1970

3,547,149

CARL BLOOM
INVENTOR.

BY Daniel H. Bobis
Atty

APPARATUS FOR MEASURING AND INDICATING FLUID PRESSURE ACROSS A FLUID RESTRICTION

CROSS REFERENCES TO RELATED APPLICATIONS

This is a division of application Ser. No. 491,223, filed Sept. 29, 1965 and issued Dec. 3, 1968 as U.S. Pat. No. 3,413,855.

SUMMARY OF THE INVENTION

This invention relates generally to fluid carrying systems, and more particularly, to apparatus in combination with the fluid carrying lines in such systems for measuring the pressure at fixed points in said lines and indicating the difference tn pressure between said fixed points and the change in pressure across an existing restriction to fluid flow in said fluid carrying lines, which restriction may from time to time be subject to change in the total area of the fluid flow opening during the operation of said systems.

In a system for carrying fluids, as for example an oil or gas pipeline system, or a portable compressor system, it is often desirable to place filters in the fluid carrying lines at various points, to extract dirt particles, and for other well known reasons.

Such filters, and other devices which produce a restriction in the fluid carrying lines, have a greater fluid pressure on their upstream side, than on their downstream side. This difference in pressure which is due to friction loss and reduction in the total flow area can be measured and is referred to as "-differential pressure."

If the filter, or other fluid restriction, develops an increased resistance to fluid flow, the "differential pressure" or "pressure drop" across said filter or fluid restriction, will also increase. Thus, in an oil pipeline system, when the oil filter, through continued use, extracts more and more dirt particles from the oil passing through it, the resistance of the oil filter to the oil flow will increase, causing a corresponding increase in "differential pressure" across the oil filter.

In prior art devices this differential pressure has been measured by two separate gauges; an upstream pressure gauge, and a downstream pressure gauge.

Measuring the upstream and downstream pressures by means of separate gauges is inaccurate. To obtain accurate readings, the gauges would first have to be compared with one another. This comparison would have to proceed on two fronts. First, a reference point would have to be established at zero flow. Second, the gauges would have to be calibrated with respect to one another. This is cumbersome, impractical and often impossible to accomplish while the system is operating, because, first, in many systems where some discharge fluid is always bled to operate controls, the condition of zero flow cannot be obtained, and second, a two-gauge system requires periodic recalibration of the gauges with respect to one another.

Of course, prior art devices which merely indicate the existence of pressure changes without measuring their value, would be of little use in systems where the actual values of pressures and pressure changes are important.

Assuming that in normal operation the resistance in the filter or other fluid restriction is small enough to permit maintenance of a predetermined downstream pressure, then a drop in such downstream pressure, unaccompanied by a corresponding drop in upstream pressure, would be indicative of an increase in the resistance of the filter or restriction.

The present invention is particularly adaptable in such systems to indicate that the filter should be changed, and overcomes the problems presented by the prior art devices.

Thus, the present invention covers a means in a fluid carrying system having a line with a fluid restriction therein comprising, a device in the line disposed across the restriction with a single gauge therein; to measure and indicate the pressure downstream of said fluid restriction; to measure and indicate the pressure upstream of said fluid restriction; and to enable one to determine the value of the pressure drop across the fluid restriction.

Accordingly, an object of this invention is to provide a means for selectively indicating and measuring the upstream and downstream pressures on either side of an in-line fluid restriction.

Another object of this invention is to provide an improved fluid pressure measuring means, which means in itself is capable of accurately and easily indicating the pressure drop across an in-line fluid restriction.

Various other objects and advantages will be apparent from the following description of one embodiment of the invention.

IN THE ACCOMPANYING DRAWINGS

Figure 2:
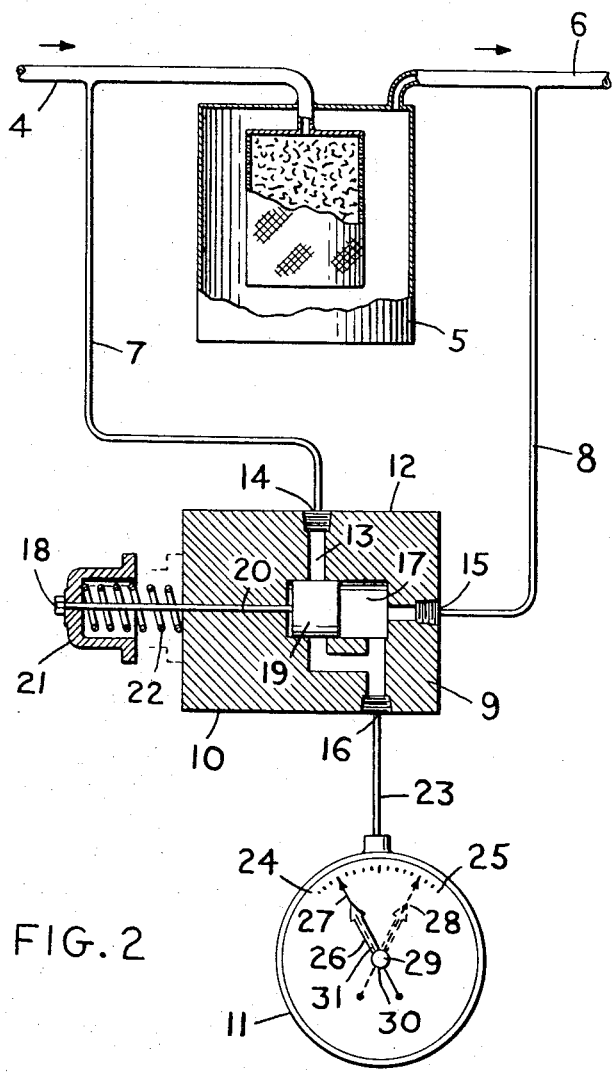

FIG. 1 is a schematic representation of a rotary compressor installation having attached thereto an apparatus for measuring the pressure drop across an in-line restriction; and FIG. 2 is a schematic representation of said apparatus and said restriction.

In the illustrated embodiment of the invention as shown in FIG. 1, the compressor 1 may be of any conventional type. It discharges through a conduit 2 into a fluid receiving tank 3, which again may be of any conventional type, including a multifluid tank, e.g. an air oil tank. Fluid is discharged from this tank through a line 4 to the upstream side of fluid restriction 5, which can be a filter, or, in the case of particular portable or industrial compressors, a demister, and after passing through the filter is discharge in line 6 downstream of the filter and thence through the system.

Fluid pressure discrimination means 9 is shown shunting the fluid restriction 5 by means of first and second inlet conduits 7 and 8 respectively.

The discrimination means is shown in expanded schematic in FIG. 2, wherein 10 is a control means, e.g. a three-way valve, and 11 is an indicating and measuring means, e.g. a gauge.

The valve 10 comprises a housing 12 with a fluid flow passage 13 therein, first and second inlet ports 14 and 15 respectively, and discharge port 16, for the introduction and egress respectively of fluids therethrough, and chamber means 17 for coaction with actuating means 18 in order to selectively restrict the flow of fluid from one or the other inlet ports to the discharge port.

Actuating means 18 comprises internal element 19 which is slidably mounted in chamber means 17 and which is capable of sealing off the flow of fluid from either of the first and second inlet ports 14 and 15, movable mounting means 20 which is movably mounted in housing 12 and is effectively sealed, in any conventional manner, to prevent the flow of fluid from the chamber 17 between it and the housing 12, and external impulse means, e.g. push button 21, connected to a source of potential energy, e.g. spring 22, which serves to actuate the actuating means by providing a means for receiving and transmitting an external force, e.g. that supplied by thumb pressure, to the movable mounting means 20, whereby the internal element 19 can be made to move from its depicted position, in order to seal off inlet port 15 and simultaneously open inlet port 14; the spring 22 being an optional means of returning the internal element 19 to its originally depicted position.

The gauge 11 is connected to the discharge port 16 by conduit 23 and is thereby made to be in fluid communication with the fluid in the system, i.e. either fluid in line 6 by way of conduit 8, second inlet port 15, flow passage 13 and chamber 17, or the fluid in line 4 by way of conduit 7, first inlet port 14, flow passage 13, and chamber means 17. It is thus possible for the gauge selectively to receive a pressure signal from either the upstream or the downstream side of the filter depending on the position of the actuating means 18. The gauge is provided with an indexed dial 24 depicting the units of pressure 25 in any standard measure, e.g. pounds per square inch (p.s.i.), and at least two hands 26 and 27 which may vary in length, shape or color, and which indicate and measure the pressure in response to the pressure signal given as previously described.

Hand 26 is not in itself responsive to pressure signals independently of hand 27. Hand 26 may be rotated manually by any conventional means, e.g. by knob 29 at its pivot point 30.

A typical mode of operation would be to have hand 27 move hand 26 to the alternate position 28 in response to an upstream pressure signal from line 4. Since the downstream pressure in line 6 is less than this upstream pressure in line 4, the hand 27 would return to its original position 31 upon once again receiving a downstream pressure signal. This operation can be very easily accomplished by simply pressing on the button 21 with the thumb, thereby depressing the spring 22, and then releasing the thumb pressure and allowing the spring 22 to return the actuating means to its original position as depicted. Hand 26 would remain in alternate position 28 until manually returned by knob 29 to a position in engagement with hand 27.

When the valve is actuated as just described, it indicates and measures the downstream pressure and the upstream pressure. The use of one valve provides an accurate measurement; and the use of one gauge with hands disposed as described easily indicates the differential pressure.

Of course, the differential pressure could also be measured by having the operator read and note the difference between the two pressures indicated by a single gauge needle.

Note the added advantage that when the three-way valve 10 is not actuated, as in its depicted position, it normally indicates the pressure downstream, which is of constant interest to the operator.

In a typical situation, an operator, noting a drop in downstream pressure to below that of the required value for his system, will have make a "filter check.". This consists of pressing and releasing the button 21 as previously described, and observing the pressure drop across the filter. If this drop is greater than the allowable drop for clean filters, he knows that the filter needs to be replaced.

This invention also allows him to check the filter for replacement, even though the downstream pressure remains at an acceptable value. Thus it provides him not only with a check against a possible detriment to the overall system due to excessive pressure drop, but also with a check against the operation of the filter itself, i.e. as to whether it's functioning properly by keeping the fluid sufficiently pure.

It will be understood that various changes in the details, materials and arrangements of parts which have been herein described and illustrated in order to explain the nature of the invention, may be made by those skilled in the art within the principle and scope of the invention, as expressed in the appended claims.

I claim:

1. In a pressure fluid system including a compressor having an inlet and discharge outlet, a discharge line connected to said compressor discharge outlet, a receiving tank in said discharge line downstream of said compressor, and a fluid filtering means in said discharge line downstream of said receiving tank, the combination therewith of:

a. a three-port valve for selecting a point for line pressure measurement, having one port connected to the upstream side of said fluid filtering means, and another port connected to the downstream side of said fluid filtering means, and actuating means for alternately communicating the remaining port with the upstream side of said fluid filtering means through the one port and with the downstream side of said filtering means through the other port; and b. a single indexed dial gauge connected to said remaining port for indicating and measuring the upstream and downstream line pressure selected by said valve whereby the differential pressure across said fluid filtering means may be determined.